G. MOORE & G. CURKENDALL.
Plow-Irons.
No. 164,022.　　　　　　　　　　　　Patented June 1, 1875.
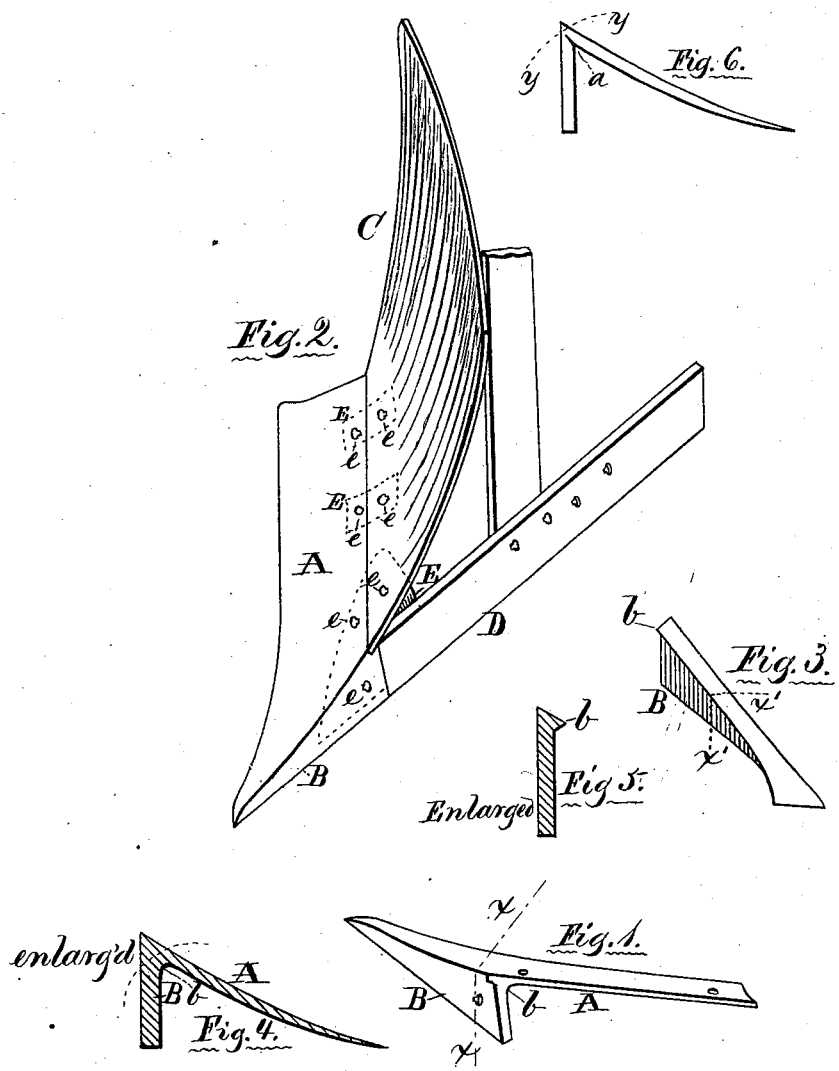

UNITED STATES PATENT OFFICE.

GILPIN MOORE AND GEORGE CURKENDALL, OF MOLINE, ILLINOIS, ASSIGNORS TO DEERE & CO., OF SAME PLACE.

IMPROVEMENT IN PLOW-IRONS.

Specification forming part of Letters Patent No. 164,022, dated June 1, 1875; application filed January 6, 1874.

*To all whom it may concern:*

Be it known that we, GILPIN MOORE and GEORGE CURKENDALL, of Moline, in the county of Rock Island and State of Illinois, have invented certain new and useful Improvements in Plows, of which the following is a specification:

It is here premised, generally, that the improvements hereinafter described relate to that class of plows (generally known as turning-plows) in which what are known in the trade as slip-shares or removable shares are used, and in which all of the parts being made to gage, they are interchangeable, and permit furnishing duplicates for any part, and more especially for those parts most subject to wear and destruction from use.

The first part of said invention relates to improvements in the forward end of the land-side bar that end which, when welded to the share, constitutes therewith the slip-share; and the invention consists in constructing said forward land-side bar with a lateral flange projecting from its upper edge and side, which shall be next the share when welded thereto, the object of said flange being to facilitate welding the land-side from which it projects to the share, to produce a better weld than when the flange is absent, and to thicken and strengthen the parts at their point of union, all as hereinafter fully described.

The second part of said invention relates to the improved article of manufacture produced by welding the flanged land-side, referred to in the above narration of the first part of said invention, to the share, all as hereinafter fully described.

To enable others skilled in the art to understand and use our invention, we will now proceed to describe its construction and operation, referring by letters to the accompanying drawing, in which—

Figure 1 is a perspective view of a plowshare with the forward land-side bar attached thereto, and embodying our invention; Fig. 2, a perspective view, showing Fig. 1 in position upon a plow; Fig. 3, a perspective view of the short or forward land-side bar; Fig. 4, a sectional view of Fig. 1 on the plane of the line $x\,x$; Fig. 5, a sectional view of Fig. 3 on the line $x'\,x'$; and Fig. 6 is a perspective view, illustrating the defective construction arising from turning down the side of the share to form the forward land-side bar as a flange thereon.

A is the plowshare. B is our improved forward land-side bar, formed of the ordinary blank, with a lateral flange, $b$, along its upper edge, as shown in the drawing, and which may be produced upon said blank by any desirable process, and upon the right hand or left hand thereof, for a right-hand or left-hand plow, respectively.

It will be evident to any one skilled in the art to which this invention appertains that by using dies in welding this forward land-side bar B to the plowshare A which fit accurately upon the one side, the exterior or salient angle formed by the bar B and the share A, and upon the other side fit accurately the under side of the flange $b$, and into the re-entering angle formed by the share A and bar B, and also upon the lower edge of the bar B, the adjacent parts of the land-side bar B and share A may be pressed or beaten into the most intimate and permanent union, forming a weld with all the superiority of a scarf-weld.

It is well known to persons experienced in manufacturing plows of this class that when the land-sides B are attached to the shares by the ordinary jump-weld, the union of the parts is so imperfect as to permit of their springing apart frequently in welding and hardening, and allow them to be broken apart in use often when only partially worn out at their junction. When the forward land-side B is formed by turning down the side of the share A, as is sometimes done, the process of turning it down and the operations required to produce the necessary angular exterior will form a recess, $a$, as shown at Fig. 6, and thus so weaken the device at the angle as to cause its breakage by use when worn off, as shown by dotted lines $y\,y$ at same figure.

The short land-side bar B, having the flange $b$, may be made and furnished to plow-manufacturers by makers of blanks, or it may be made by the plow-manufacturers themselves, and the same may be done with the slip-shares.

It will be evident to those skilled in the art that our improvement does not consist alone in producing a superior weld of the aforesaid parts by virtue of the flange $b$ extending outward upon the under side of the share A, but that the parts can be beaten or pressed together to a better advantage with the aid of the flange $b$, and produce a superior weld of the edge or body of the land-side B to the share A; and, further, that the flange $b$ will add thickness and strength to the parts of the land-side B and share A adjacent to each other to the extent of the quantity of solid iron of which said flange is composed, resting in the re-entering angle formed by their union, and constituting a remaining support when the exterior parts are worn away by use, as shown by dotted lines at Fig. 4.

It will be readily seen that this invention is applicable to slip-shares in which the land-side is formed of a single bar.

Different methods of attaching slip-shares to plows are too well known to require description here.

One method is shown at Fig. 2, in which C is the ordinary steel mold-board; D, the rear land-side; and E E E $e\ e\ e\ e\ e\ e$, in dotted lines, plates and bolts, respectively, by which the slip share is secured to the plow.

What is claimed as the said invention is—

1. A forward land-side bar, B, for plows, having a lateral flange, $b$, along its upper edge, substantially as described, and for the purpose specified.

2. A slip-plowshare, when constructed of the ordinary share and a flanged land-side bar, substantially as described, and for the purpose specified.

GILPIN MOORE.
     GEORGE CURKENDALL.

Witnesses:
 S. H. VELIE,
 E. MAPES.